(No Model.)
J. P. MILLER.
RECIPROCATING BRICK MACHINE.
No. 377,767. Patented Feb. 14, 1888.
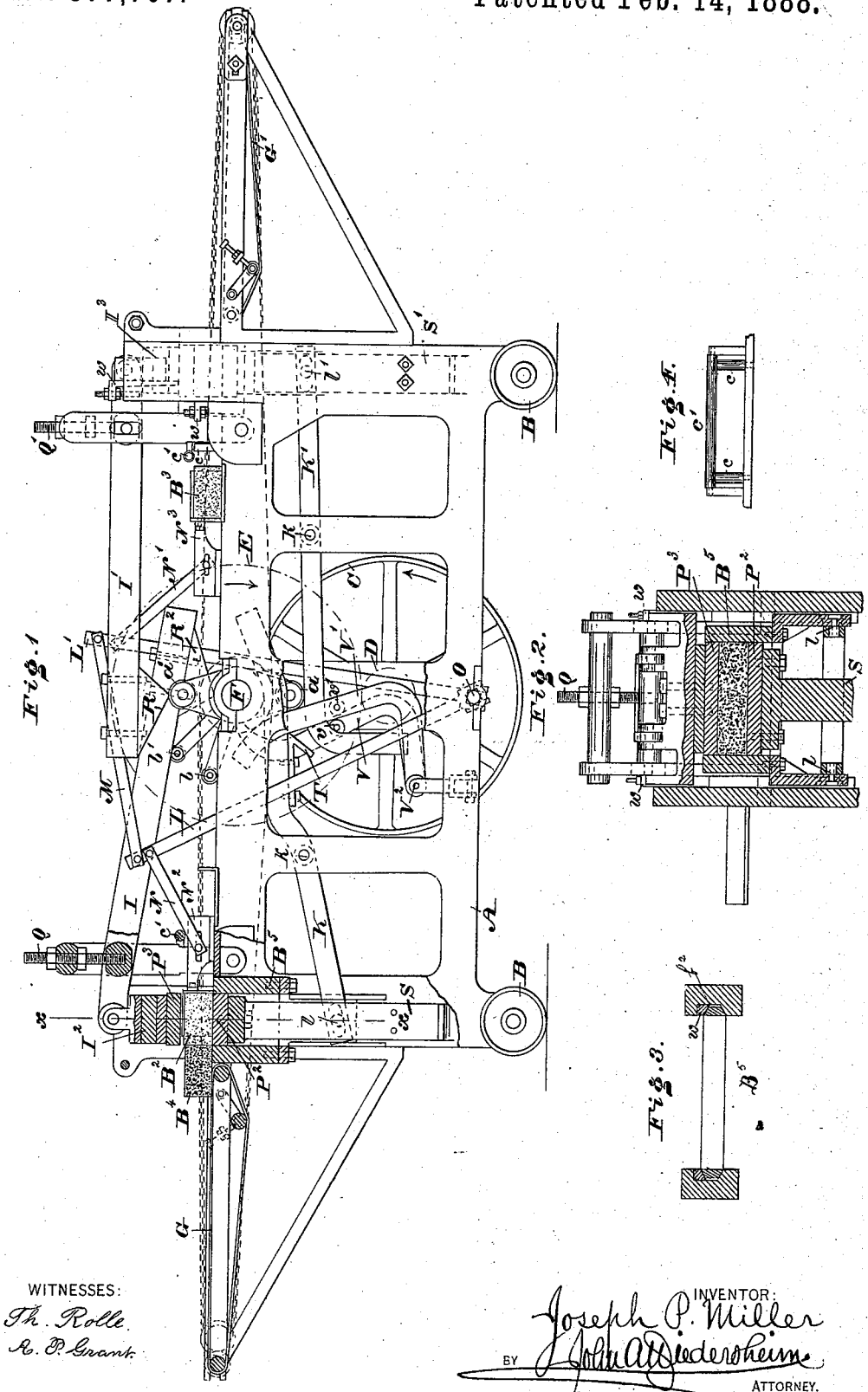
WITNESSES:
Th. Rolle
A. P. Grant
INVENTOR:
Joseph P. Miller
BY John A. Wiedersheim
ATTORNEY.
N. PETERS, Photo-Lithographer, Washington, D. C.

UNITED STATES PATENT OFFICE.

JOSEPH P. MILLER, OF PHILADELPHIA, PENNSYLVANIA.

RECIPROCATING BRICK-MACHINE.

SPECIFICATION forming part of Letters Patent No. 377,767, dated February 14, 1888.

Application filed April 21, 1887. Serial No. 235,627. (No model.)

*To all whom it may concern:*

Be it known that I, JOSEPH P. MILLER, a citizen of the United States, residing in the city and county of Philadelphia, State of Pennsylvania, have invented a new and useful Improvement in Brick-Presses, which improvement is fully set forth in the following specification and accompanying drawings.

My invention relates to improvements in brick-presses; and it consists in an improved apparatus by which bricks are re-pressed and rendered more compact and even in form.

I will now describe my improved mechanism in detail, and particularly point out in the claims that follow this specification the novel features thereof.

Figure 1 is a longitudinal vertical section through my machine, showing the essential features thereof in side elevation, parts of the frame being broken away. Fig. 2 is a cross-section on line $x$ $x$, Fig. 1, showing the parts in the position they would assume when the brick is being pressed. Fig. 3 is a detail view showing means for tightening the sliding frame or box. Fig. 4 is a detail view of the rollers for shaping the bricks before they enter the press.

Similar letters of reference indicate corresponding parts in the several figures.

Referring to the drawings, A represents the frame of the machine supported upon rollers B B; C, the driving-pulley connected by a belt or otherwise to the source of power, from which the power is transmitted through pinion D to a large gear-wheel, E, supported upon a shaft, F, in journals in the upper part of the frame, as shown. Upon this shaft F are arranged a series of cam-arms having rollers $a$ $a'$ $b$ $b'$ in their outer ends. These cam-arms are distributed upon the shaft F in such relation as to operate successively the mechanism first in the right-hand portion of the machine and then the left.

I I' are levers sustained by screws Q Q' in uprights pivoted to the body of the machine, as clearly shown.

R R$^2$ are weighted cam-surfaces attached to the inner ends of the levers I I' for giving them vertical motion under the action of the rollers $a$ $a'$. To the outer ends of the levers I I' are attached, pivotally, plungers I$^2$ I$^3$, adapted to press the bricks B$^2$ B$^3$, as will be hereinafter more fully disclosed.

In the left and right hand ends of the machine are shown two upright standards, S S', firmly fixed to the frame of the machine at their lower ends. At the upper ends of these standards are attached plunger-heads P$^2$, (shown in Figs. 1 and 2,) which may be of varying sizes, adapted to the size of the brick it is desired to re-press, said plunger-heads being always of the same size as upper plunger-head, P$^3$. (Clearly shown in Fig. 2.)

B$^5$ B$^5$ are brick-forming chambers, adapted to slide in guideways $f^2$, so as to be raised or lowered by the levers K K', to which said chambers are respectively attached at the points $l$ $l'$, so that when the levers K K' tilt upon their fulcrums they will raise or lower the chambers, as will be hereinafter described.

L L' are two levers pivoted to the base of the frame at the point O and connected together by the link M. At the upper end of the lever L the link N is adjustably connected to the brick-feeding shoe N$^2$, and similarly the lever L' is connected to the link N' of the brick-feeding shoe N$^3$.

V V' are two bell-crank levers pivoted to the bottom of the frame at V$^2$, and having at their middle portions the rollers $v$ $v'$, adapted to take, respectively, against the incline T on lever K and the bent portion of lever K', as will be understood upon examining Fig. 1. The rollers $a$ $a'$ operate these parts successively as well as the levers I I', as will be hereinafter more fully described.

G G' are the aprons with the usual belt and chain gear for carrying the bricks from the presses in opposite directions to the point of delivery, it being understood that the apron G' carries the bricks to the right, while G carries them to the left. This is accomplished, in a manner well understood, by chain gearing, as shown, acting directly upon the pulley to the right of the machine, which gears into a pinion, as shown, and reverses the direction of motion of the apron.

$c$ $c$ $c'$ are three rollers adapted to shape the bricks before entering the press.

I will now describe the mode of operation of my improved machine. Bricks are brought in a crude form from the well-known form of brick-making machine, and the operator places them successively against the shoes N$^3$ N$^2$. As the pulley C advances to the left in the direction of the arrow, it causes the pinion D to rotate gear-wheel E in the direction of the upper arrow. This action causes the cam-arms to rotate with their rollers $a\ a'$. The weighted end R of the cam-lever I' is raised, thereby pressing the brick in its brick-forming chamber $B^5$. While the lever I' is in its raised position the lever I is allowed to drop, thus lifting the upper right end of said lever, and with the plunger-head $P^3$ at the same time the roller $a$ at the lower side of the shaft comes in contact with the bent end of the lever V', pivoted at $V^2$, thereby causing said lever to tilt about said point and bring the roller $v'$ against the bent end of lever K', so as to cause it to rise, thus tilting the latter about its fulcrum $k$ and lowering the brick-forming chamber $B^5$. The shaft, continuing its rotation, carries with it a cam-arm bearing a roller, $b'$, which comes into contact with the lever L', thrusts it forward, and through the connection of link N' causes the brick-carrying shoe $N^3$ to force the brick forward under the plunger-head $P^3$. In the meantime roller $a'$ has advanced to a point slightly to the right of that occupied by roller $a$, as seen in the drawings, while $a$ has advanced one hundred and eighty degrees, or to a point slightly to the left of where $a'$ is seen in the drawings. In this position the said rollers $a\ a'$ are respectively in condition to act upon levers I and K', it being understood that said levers K' and I and roller $a$ are in the same vertical plane longitudinally through the machine, while levers K and L' and roller $a'$ are in a similar parallel plane, so that roller $a'$ will act only upon the lever I' at the right of the machine in its upward progress, and lever K below at the left-hand end of the machine at its lower point, while the roller $a$ acts in a similar manner on the levers K' and I, located, respectively, at the right and left hand ends of the machine.

It will thus be seen that the levers I' K' operate together, under the action of the rollers $a\ a'$, to press the bricks in the right-hand end of the machine, while the levers I K act in a similar manner, but under the reverse action of said rollers, to press the bricks in the left of the machine. It will also be seen that the rollers $b\ b'$ are located at different angles of the shaft F to allow the brick-feeding shoes $N^2\ N^3$ to remain stationary for an instant of time, so as to permit the insertion of the bricks in said shoes.

At the left-hand end of Fig. 1 the operation is clearly shown.

It will be seen that on the insertion of the brick, $B^2$ or $B^3$, preparatory to pressing it, the shoe $N^2$ or shoe $N^3$ causes the brick $B^4$, in finished condition, to be forced onto the apron G. It is then carried away in a manner well understood.

I provide against wear of the brick-forming chamber $B^5$ and plunger $P^3$ and its supporting-frame by inserting at the upper end of the frame in the guideways an adjustable wedge, $w$, with screw adjustment, as shown at the upper right-hand portion of Fig. 1 and in detail section found in Fig. 3.

I provide for the pressing of bricks of various sizes by the insertion of brick-carrying chamber $B^5$ with plunger-heads $P^3\ P^2$ of varying sizes, as desired, by adjustably attaching such parts, as shown in Figs. 1 and 3, and also by securing the pivoted levers I I' adjustably by screws Q Q', as is clearly shown in Figs. 1 and 3.

Having thus described my invention, what I claim as new, and desire to secure by Letters Patent, is—

1. In a brick-machine, the frame A, with shaft F and operating mechanism, substantially as described, for said shaft, a series of cam-arms secured to said shaft and having rollers thereon, the pivoted levers I I', with weighted cam-surfaces, and plungers $I^2\ I^3$, the said plungers being secured to the outer ends of said levers, said parts being combined substantially as described.

2. In a brick-machine, the frame A, with shaft F and operating mechanism therefor, in combination with a series of cam-arms mounted on said shaft and having rollers, the levers I I', with weighted cams, the plungers $I^2\ I^3$, and the pivoted levers K K', with the brick-forming chambers $B^5$, substantially as described.

3. In a brick-machine, the frame A, with the shaft F and operating mechanism therefor, in combination with a series of cam-arms with rollers thereon, the levers I I', with cam-pieces, and plungers $I^2\ I^3$, the levers K K', with brick-forming chambers $B^5$, the levers L L', pivoted at O and connected by link M, the links N N', and shoes $N^2$ and $N^3$, substantially as described.

4. In a brick-machine, the shaft F, suitably mounted and having operating mechanism, substantially as described, in combination with a series of cam-arms having rollers, the pivoted levers I I', with weighted cams, the levers K K', with brick-forming chambers $B^5$, the levers L L', pivoted at O and connected by link M, the shoes $N^2$ and $N^3$ and connecting-links N N', and the pivoted bell-crank levers V V', with rollers, substantially as and for the purpose set forth.

5. The combination of the brick-forming chamber with the sliding shoes and the brick-shaping rollers, and mechanism, substantially as described, for operating said parts.

6. In a brick-press, the combination of the plunger-heads $P^3\ P^2$, sliding brick-forming chamber $B^5$, pivoted levers I K, shaft F, rollers $a\ a'$, connected to arms attached to said shaft, and levers L L', having links M N, the guide-shoe $N^2$, and roller $b$, connected with the shaft, substantially as described.

JOSEPH P. MILLER.

Witnesses:
JOHN A. WIEDERSHEIM,
JAS. F. KELLY.